(12) United States Patent
Minner

(10) Patent No.: US 11,121,867 B2
(45) Date of Patent: Sep. 14, 2021

(54) ENCRYPTION METHODS BASED ON PLAINTEXT LENGTH

(71) Applicant: ENTIT SOFTWARE LLC, Sanford, NC (US)

(72) Inventor: Richard Minner, Cupertino, CA (US)

(73) Assignee: Micro Focus LLC, Santa Clara, CA (US)

(*) Notice: Subject to any disclaimer, the term of this patent is extended or adjusted under 35 U.S.C. 154(b) by 381 days.

(21) Appl. No.: 15/999,250

(22) PCT Filed: Feb. 19, 2016

(86) PCT No.: PCT/US2016/018780
§ 371 (c)(1),
(2) Date: Aug. 17, 2018

(87) PCT Pub. No.: WO2017/142563
PCT Pub. Date: Aug. 24, 2017

(65) Prior Publication Data
US 2020/0235922 A1  Jul. 23, 2020

(51) Int. Cl.
*H04L 9/00* (2006.01)
*H04L 9/08* (2006.01)
*H04L 9/14* (2006.01)

(52) U.S. Cl.
CPC .............. *H04L 9/0861* (2013.01); *H04L 9/14* (2013.01)

(58) Field of Classification Search
USPC .......................................................... 380/44
See application file for complete search history.

(56) References Cited

U.S. PATENT DOCUMENTS

| 5,937,066 A | 8/1999 | Gennaro et al. |
| 8,677,123 B1 | 3/2014 | McGregor, Jr. et al. |
| 8,949,625 B2 | 2/2015 | Spies et al. |
| 2008/0104417 A1* | 5/2008 | Nachtigall ............ H04L 9/0822 713/193 |
| 2010/0172494 A1* | 7/2010 | Henson ................. H04L 9/0643 380/28 |

(Continued)

OTHER PUBLICATIONS

International Searching Authority., International Search Report and Written Opinion dated Nov. 8, 2016 for PCT Application No. PCT/US2016/018780 Filed Feb. 19, 2016. 15 pages.

(Continued)

*Primary Examiner* — Jeffrey C Pwu
*Assistant Examiner* — Samuel Ambaye

(57) ABSTRACT

Examples discussed herein disclose, among other things, a method. The method includes, among other things, obtaining a plaintext, obtaining a key from a plurality of keys, and determining whether the plaintext is longer than a predefined threshold length. If the plaintext is longer than the predefined threshold length, the method may encrypt the plaintext with the key to generate a first ciphertext having a length of the plaintext, where the character at a predefined position within the first ciphertext belongs to a first subset of characters. And if the plaintext is not longer than the predefined threshold length, the method may encrypt the plaintext with the key to generate a second ciphertext, which is longer than the plaintext, where the character at the same predefined position in the second ciphertext belongs to a second subset of characters.

15 Claims, 6 Drawing Sheets

(56) References Cited

U.S. PATENT DOCUMENTS

| | | |
|---|---|---|
| 2010/0293377 A1 | 11/2010 | Tardo |
| 2012/0131354 A1 | 5/2012 | French |
| 2012/0151221 A1* | 6/2012 | Koifman .................. G06F 21/78 |
| | | 713/189 |
| 2012/0230492 A1* | 9/2012 | Fujisaki ................ H04L 9/0637 |
| | | 380/277 |
| 2014/0344580 A1 | 11/2014 | Von Mueller et al. |

OTHER PUBLICATIONS

Meer, M.V.D., Practical Security and Key Management, May 26, 2014, University of Amsterdam, Research Project 2, 35 pages.

Unknown, Format-Preserving Encryption (FPE), Innovative Routines International, Inc. Retrieved from the Internet: <http://www.iri.com/solutions/data-masking/encryption/format-preserving-encryption> [retrieved on Dec. 29, 2015], 4 pages.

* cited by examiner

ENCRYPTION METHODS BASED ON PLAINTEXT LENGTH

BACKGROUND

Some cryptographic systems today support a mechanism called "key rollover," where a given encryption key being used to encrypt plaintext can at some point be retired and replaced by another encryption key. In these systems, in order to decrypt a ciphertext (i.e., an encrypted plaintext), the decrypting device needs to first determine which key was used to generate the ciphertext. For example, in a system that supports up to 64 different keys, the decrypting device needs to determine which of the 64 possible keys was used to perform the encryption.

BRIEF DESCRIPTION OF THE DRAWINGS

The following detailed description references the drawings, wherein.

DETAILED DESCRIPTION

Figure 1:
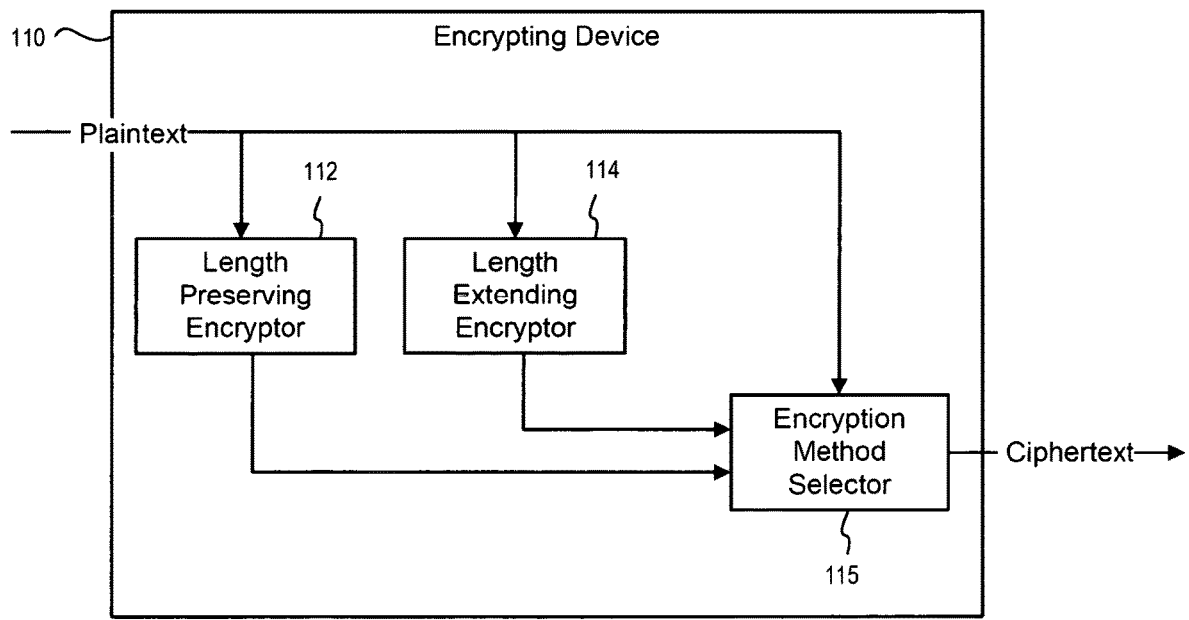
FIG. 1 is a block diagram of an example encrypting device.

One approach to determining the key that was used to generate a particular ciphertext is to use external data, such as timestamps or related database columns. This approach is often unreliable, technologically challenging, or both. Another approach is to embed into the ciphertext a key reference which can be used by the decrypting device to determine the key. This can be achieved, for example, by expanding the character domain of the ciphertext relative to the character domain of the plaintext and use the additional character space to embed the key reference. As used herein, a "character domain" may correspond to any finite set of characters. To illustrate how domain expansion can be used to support key rollover, a system can be considered in which numerical plaintexts are be mapped to alphanumerical ciphertexts, thereby expanding the character domain from ten to 36 characters, where 36 corresponds to ten digits plus 26 letters of the English alphabet (assuming, e.g., that the system is not case sensitive). In such a system, a six-character-long numerical plaintext, for example, can be mapped into $36^6/10^6=2176$ different six-character-long alphanumeric ciphertexts, allowing the system to support up to 2176 different encryption keys for plaintexts up to six characters long, where the encrypting device can map the plaintext to a particular ciphertext based on the current encryption key, and where decrypting device can use the value of the ciphertext to determine which key was used to produce the ciphertext and therefore should also be used to decrypt it.

Such an approach may not be used, however, when the combination of the length of the plaintext, the size of the plaintext's character domain, and the size of the ciphertext's domain does not allow for a sufficient number of keys. Put differently, given a system having a particular plaintext character domain size P and a particular ciphertext character domain size C, in order to support a given number of keys K, the plaintext (and the ciphertext) needs to have a certain minimum length L. In some examples, L should be such that $[(C/P)^L] \geq K$. To illustrate, in an example system where the character domain of the plaintext has 52 characters (e.g., 26 lowercase letters and 26 uppercase letters) and the character domain of the ciphertext is extended to also include ten digits (for a total of 62 characters), a plaintext of length N can include $62^N/52^N$ different keys. In such a system, for example, the number of keys supported for a given length is shown below in Table 1:

TABLE 1

| Length | Number of keys | Number of keys (rounded down) |
| --- | --- | --- |
| 1 | $62^1/52^1 = 1.19$ | 1 |
| 2 | $62^2/52^2 = 1.42$ | 1 |
| 3 | $62^3/52^3 = 1.69$ | 1 |
| 4 | $62^4/52^4 = 2.02$ | 2 |
| 5 | $62^5/52^5 = 2.41$ | 2 |
| 6 | $62^6/52^6 = 2.87$ | 2 |
| 7 | $62^7/52^7 = 3.42$ | 3 |

In the above-illustrated example, if the system is to support up to three different encryption keys, the system may be able to embed up to three different keys into ciphertexts seven characters long or longer, but not into shorter ciphertexts. Accordingly, examples discussed herein describe a cryptographic system, in which longer plaintexts are encrypted using character domain expansion (where the resulting ciphertext has the same length as the plaintext), and shorter plaintexts, for which character domain expansion alone may not allow embedding of a sufficient number of different keys, are encrypted using ciphertext extension, which can be used instead of or in addition to the character domain expansion. The described system also allows the decrypting device to ascertain, based on the ciphertext, which of the two encryption methods was used, and to decrypt the ciphertext using a corresponding decryption method. Such a system provides great flexibility in terms of the type of plaintexts it can process: it may have no maximum-length restrictions because the length of long plaintexts is preserved (i.e., the resulting ciphertext will not exceed the length of the plaintext) and it may also have no minimum-length restrictions, because if the plaintext is too short to use character domain expansion, it can be encrypted using a length-extending method, as discussed below.

Specifically, some examples discussed below describe a method. The method may include obtaining a plaintext, obtaining a key from a plurality of keys, and determining whether the plaintext is longer than a predefined threshold length. If the plaintext is longer than the predefined threshold length, the method may include encrypting the plaintext with the key to generate a first ciphertext having a length of the plaintext, where the character at a predefined position within the first ciphertext belongs to a first subset of characters. If, however, the plaintext is not longer than the predefined threshold length, the method may include encrypting the plaintext with the key to generate a second ciphertext, which is longer than the plaintext, where the character at the same predefined position in the second ciphertext belongs to a second subset of characters.

FIG. 1 shows an example encrypting device 110. Encrypting device 110 may include any type of electronic device suitable for performing the functionality discussed herein. For example, encrypting device 110 be a smartphone, a computer of any kind (e.g., a laptop, a desktop computer, a server, and so forth), a network device, a gaming device, a home appliance, or any other type of electronic device or equipment. In some examples, encrypting device 110 may include a combination of any number of electronic devices or engines that together may implement the functionality of encrypting device 110 described herein.

As illustrated in FIG. 1, encrypting device 110 may include, among other things, a length-preserving encryptor 112, a length-extending encryptor 114, and an encryption method selector 115, each of which may generally represent any combination of hardware and programming that may be embedded in encrypting device 110 or communicatively coupled thereto. While in FIG. 1 length-preserving encryptor 112, length-extending encryptor 114, and encryption method selector 115 are shown as separate engines, it is appreciated that the functionality of these engines may be implemented in a single engine, or distributed in any suitable way over any number of communicatively coupled engines.

Encrypting device 110 may also include or be communicatively coupled (e.g., via one or more networks) to a key database, not shown in FIG. 1 for brevity. In some examples, some or all communications between encrypting device 110 and the key database may be encrypted. The key database may store a predefined number of predefined or dynamically generated encryption keys, for brevity referred to hereinafter as "keys." In some examples, each key may be associated with a key reference uniquely identifying the key among all the keys available for encryption. Key reference may be, for example, a number uniquely identifying the key (e.g., 1, 2, 3, etc.), a string uniquely identifying the key by number (e.g., "01," "02," "03," etc.), or by name (e.g., "KEY_A," "KEY_B," "KEY_C," etc.), a string representing a timestamp associated with and uniquely identifying the key (e.g., "2016/01/01," "2016/02/01," etc.), or any other type of reference uniquely identifying the key.

As illustrated in FIG. 1, length-preserving encryptor 112 length-extending encryptor 114 may each obtain a plaintext. The plaintext may be obtained, for example, from a memory, from a user input device (e.g., a physical or virtual keyboard), or from any other type of engine or device, which may be either included in encrypting device 110 or communicatively coupled thereto. The obtained plaintext may include any number of characters, where the characters may be any characters from a certain character domain. In some examples, all plaintexts obtained and processed by encrypting device 110 and its engines may contain characters from a particular character domain, and may not contain characters outside of that character domain.

As will be discussed in more detail below, encryptors 112 and 114 may each encrypt the obtained plaintext and produce a ciphertext, where each encryptor may use a different encryption method and therefore produce a different ciphertext. In the example illustrated in FIG. 1, decryption method selector 125 obtains the two ciphertexts and outputs one of the ciphertexts. It is appreciated, however, that in other examples, selector 125 may cause decrypting device 120 to select and output one of the ciphertexts without obtaining the two ciphertexts from encryptors 112 and 114. For example, the outputs of encryptors 112 and 114 may be provided to another device, such as a multiplexer (not shown), which may be controlled by selector 125 to selectively output one of the provided ciphertexts. Furthermore, while in some examples both encryptors 112 and 114 may be simultaneously enabled to obtain the plaintext, encrypt it, and output the ciphertext, in other examples, selector 112 may selectively enable one of the two encryptors and disable the other encryptor using control signals (not shown for brevity), such that the disabled encryptor cannot process the plaintext.

In some examples, length-preserving encryptor 112 may obtain the plaintext and encrypt it using length-preserving encryption such that the resulting ciphertext has the same length (i.e., the same number of characters) as the plaintext. Encryptor 112 may also encrypt the plaintext such that a key that was used to encrypt it can be ascertained based on the ciphertext. For example, encryptor 112 may encrypt the plaintext such that a key reference associated with the key could be ascertained based on ciphertext alone, without any additional information. The key reference could then be used to obtain the key from the key database.

To achieve these objectives, in some examples, encryptor 112 may expand the character domain of the ciphertext relative to the character domain of the plaintext. For example, encryptor 112 may use a pseudo-random mapping function, which may use the key to pseudo-randomly map the plaintext to one of a plurality of ciphertexts. The plurality of ciphertexts may include, for example, all possible combinations of characters within a character domain that is larger than the character domain of the plaintext. Thus, the plurality of ciphertexts may be greater than the plurality comprising all possible plaintexts. Accordingly, a given plaintext can be mapped by the mapping function into a plurality of (i.e., two or more) ciphertexts, where the particular ciphertext to which a plaintext is mapped may depend on the key that is used by encryptor 112. This may allow a decrypting device to determine, based on the ciphertext, which of the plurality of keys was used to produce it. Put differently, a particular key may map all plaintexts into a particular subset of ciphertexts, allowing the decrypting device to determine the key by determining which subset of ciphertexts a given ciphertext belongs to.

In some examples, encryptor 112 may generate the ciphertext such that a decrypting device could determine, based on the ciphertext, that the ciphertext has been encrypted using the length-preserving encryption method described above (and not by the length-extending encryption method described below). For example, encryptor 112 may make sure that a character located at a predefined position within the generated ciphertext (e.g., the first character, the third character, the last character, the second from last character, etc.) belongs to a predefined subset of characters. The predefined subset of characters that may be used at the predefined position may be, for example, characters having an ASCII code that is greater than a predefined threshold, or characters having an odd ASCII code. For example, the predefined subset of characters may include any characters whose ASCII value is greater than 90 (the ASCII value of "Z"). In such an example, including a character "[" (ASCII code 91) at the predefined position (e.g., the last character) of the ciphertext can serve as an indicator that the ciphertext was encrypted using the length-preserving encryption method described above. Accordingly, including a character "y" whose ASCII value is less than 90 can indicate that another encryption method (e.g., the length-extending encryption method discussed below) was used to generate the ciphertext.

In some examples, encryptor 112 may ensure that the generated ciphertext includes, at the predefined position, a character from the predefined subset of characters, encryptor 112 may use a pseudo-random mapping function that always maps a plaintext into a ciphertext that satisfies that condition, or otherwise exclude ciphertexts that do not satisfy that condition from the plurality of ciphertexts into which the plaintext can be mapped.

As discussed above, in some situations the character domain of the plaintext cannot be expanded, or cannot be expanded to a degree that would allow for a sufficient number of keys, as discussed and illustrated above. In such situations, length-extending encryptor 114 may be used to encrypt the plaintext using a different method than the method used by encryptor 112. In some examples, encryptor 114, instead of or in addition to expanding the character domain of the ciphertext relative to that of the plaintext, may extend the length of the ciphertext relative to that of the plaintext, such that the decrypting device could ascertain which key was used to generate the ciphertext based at least on the additional character(s). In some examples, encryptor 114 may first generate a preliminary ciphertext having the same length as the plaintext. In some examples, the preliminary ciphertext may not include characters outside of the character domain of the plaintext, while in other examples, the character domain of the preliminary ciphertext may be expanded, in which case the character domain of the preliminary ciphertext may include characters outside of the character domain of the plaintext.

After generating the preliminary ciphertext, encryptor 114 may add to the preliminary ciphertext a set of additional characters based on which a key reference that identifies the key can be ascertained. The set of characters may include any number of characters, where the number of characters can be predefined, and where the same predefined number of characters may be added to all preliminary ciphertexts processed by encryptor 114, irrespective of the length of the plaintext. The set of characters may include, for example, one character (e.g., "0," "1," . . . "9," "A," "B," etc.); two characters (e.g., "01," "02," etc.); five characters (e.g., "KEY_B," "KEY_C," etc.); or any other predefined number of characters. For example, a plaintext "Hello" can first be encrypted by encryptor 114 using a first key into a preliminary ciphertext "uFTwQ" having the same length as the plaintext. Encryptor 114 may then add to the preliminary ciphertext a set of additional characters identifying the first key. Thus, the resulting ciphertext may be, for example, "uFTwQ01" or "uFTwQKEY_A." In some examples, the set of additional characters cannot include any characters outside of the character domain of the plaintext, while in other examples the set of additional characters can include characters outside of the character domain of the plaintext.

In some examples, the set of additional characters may be added at a set of predefined positions within the preliminary ciphertext. The set of predefined positions may Include one position or a plurality of positions. The positions at which the characters can be added may be inside the preliminary ciphertext (i.e., inserted between characters of the preliminary ciphertext), or adjacent to the preliminary ciphertext (e.g., prepended or appended to the preliminary ciphertext). If the set of additional characters contains two or more characters, the additional characters may or may not be added together as one block. For example, depending on the predefined positions, additional characters "01" may be added to preliminary ciphertext "uFTwQ01" to produce any of the following ciphertexts: "uFTwQ01," "01uFTwQ," "0uFTwQ1," "uFT01wQ," and so forth.

In some examples, encryptor 114 may also obfuscate the set of additional characters. For example, encryptor 114 may modify the set of additional characters based on the preliminary ciphertext, e.g., based on the length of the preliminary ciphertext, and/or based on any number of characters of the preliminary ciphertext. For example, encryptor 114 may obfuscate the set of additional characters by adding, to each of the additional characters, the value of the last character of the preliminary ciphertext, and modulating the resulting character such that it stays within the desired character domain. Thus, ciphertext "uFTwQ01" from the above example may be obfuscated by adding the ASCII value of the last character "Q" to each of the additional characters "01" to produce obfuscated ciphertext "uFTwQQR."

In some examples, encryptor 114 may generate the ciphertext such that a decrypting device could determine, based on the ciphertext, that the ciphertext has been encrypted using the length-extending encryption method described above (and not by the length-preserving encryption method performed by encryptor 112). For example, encryptor 114 may make sure that a character located at a predefined position within the generated ciphertext (e.g., the first character, the third character, the last character, the second from last character, etc.) belongs to a predefined subset of characters. The predefined subset of characters that may be used at the predefined position may be, for example, characters having an ASCII code that is equal to or less than a predefined threshold, or characters having an odd ASCII code. For example, the predefined subset of characters may include any characters whose ASCII value is equal to or below 90 (the ASCII value of "Z"). In such an example, including a character "Y" (ASCII code 89) at the predefined position (e.g., the last character) of the ciphertext can serve as an indicator that the ciphertext was encrypted using the length-extending encryption method described above. Accordingly, including a character "[" whose ASCII value is less than 90 can indicate that another encryption method (e.g., the length-preserving encryption method discussed below) was used to generate the ciphertext. In some examples, the subset of characters indicating a length-extending method may include any characters that fall the character domain of the plaintext.

In some examples, the subset of characters indicating a length-extending method may not intersect with the subset of characters indicating a length-preserving method. For example, the subset of characters indicating a length-extending method may include any characters that do not belong to the subset of characters indicating a length-preserving method discussed above, and vice versa. In addition, in some examples, encryptors 112 and 114 may each include a character indicating the length-preserving encryption method and the length-extending encryption method, respectively, at the same predefined position within the ciphertext. Thus, a decrypting device may determine which of the two encryption methods was used by obtaining the character at the predefined position within the ciphertext, and determining which of the two subsets the character belongs to.

While the examples discussed herein describe a single character serving as an indicator of the encryption method, it is appreciated that in other examples, any number of characters can collectively serve as indicators, where the position of each character in the ciphertext can be predefined. Thus, more generally, encryptor 112 may indicate that a length-preserving method was used by making sure that a predefined number of characters at predefined positions in the ciphertext independently or collectively satisfy one or more predefined conditions. Similarly, encryptor 114 may indicate that a length-extending method was used by making sure that a predefined number of characters at predefined positions in the ciphertext independently or collectively do not satisfy those predefined conditions.

In some examples, the predefined position(s) of character(s) indicating the encryption method may correspond to the position(s) of the set of additional characters added by encryptor 114 to indicate a key reference associated with the key. For example, the last character of the ciphertext may serve both as an indication of the encryption method and an indication of the reference key, if a length-extending encryption method was used.

As discussed above, in some examples, encryption method selector 115 may select, based on the plaintext, which of the two encryption methods should be used to encrypt the plaintext, that is, whether to use length-preserving encryptor 112 or length-extending encryptor 114 to encrypt the plaintext. In some examples, selector 115 determines which encryption method is to be used to encrypt the plaintext based on the length of the plaintext. For example, selector 115 may select the length-preserving encryption method (performed by encryptor 112) if the plaintext is longer than a predefined threshold length, and select the length-extending encryption method (performed by encryptor 114) if the plaintext is shorter than or equal to the predefined threshold length. As discussed above, the predefined threshold length may be calculated based on the desired number of encryption keys, the size of the plaintext's character domain, and the size of the ciphertext's domain, among other factors.

After determining, based on the plaintext's length, which encryption method to use to encrypt the plaintext, selector 115 may cause the appropriate encryptor (112 or 114) to perform the encryption of the plaintext, and may cause encrypting device 110 to send out the output of the appropriate encryptor. In some implementations, to achieve this, selector 115 may enable the appropriate encryptor and disable the other encryptor, or otherwise cause the functionality of the appropriate encryptor to be performed and the functionality of the other encryptor not to be performed. In other examples, the functionality of both encryptors can be performed (e.g., simultaneously), and selector 115 may cause encrypting device 110 to output the ciphertext generated by the appropriate encryptor, and to disregard the ciphertext generated by the other encryptor. For example, outputs of both encryptors 112 and 114 may be provided to selector 115 (or to another engine), and selector 115 may select (or cause the other engine to select) and provide the output of the appropriate encryptor to the output of encrypting device 110 as the resulting ciphertext.

Figure 2:
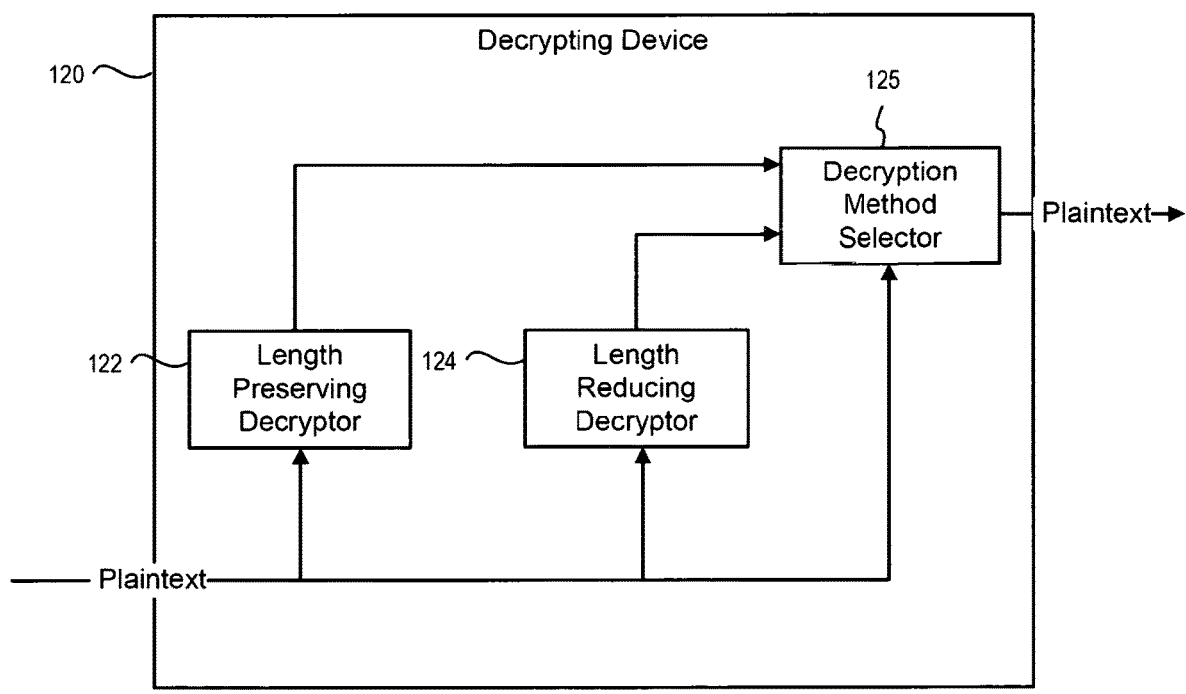
FIG. 2 shows an example decrypting device.

In some examples, the resulting ciphertext may be sent by encrypting device 110 to a decrypting device, e.g., via one or more devices and/or one or more networks, such as the Internet. FIG. 2 illustrates an example decrypting device 120 that may receive the ciphertext generated by encrypting device 110. Decrypting device 120 may be any type of electronic device suitable for performing the functionality discussed herein. For example, decrypting device 120 be a smartphone, a computer of any kind (e.g., a laptop, a desktop computer, a server, and so forth), a network device, a gaming device, a home appliance, or any other type of electronic device or equipment. In some examples, decrypting device 120 may include a combination of any number of electronic devices or engines which together may implement the functionality of decrypting device 120 described herein.

As illustrated in FIG. 2, decrypting device 120 may include, among other things, a length-preserving decryptor 122, a length reducing decryptor 124, and a decryption method selector 125, each of which may generally represent any combination of hardware and programming that may be embedded in decrypting device 120 or communicatively coupled thereto. While in FIG. 2 length-preserving decryptor 122, length reducing decryptor 124, and decryption method selector 125 are shown as separate engines, it is appreciated that the functionality of these engines may be implemented in a single engine, or distributed in any suitable way over any number of communicatively coupled engines.

Decrypting device 120 may also include or be communicatively coupled (e.g., via one or more networks) to the key database, not shown in FIG. 2 for brevity. The key database may be the same database to which encrypting device 110 is coupled, or another key database storing the same keys in association with the same key references. In some examples, some or all communications between decrypting device 120 and the key database may be encrypted Decrypting device 120 may obtain the ciphertext generated by encrypting device 110 or by a similar device. The ciphertext may be provided to length-preserving decryptor 122, length reducing decryptor 124, and decryption method selector 125. Length-preserving decryptor 122 may decrypt ciphertexts encrypted using length-preserving encryption method such as the one performed by length-preserving encryptor 112 of encrypting device 110. For example, decryptor 122 may determine, based on the ciphertext (e.g., based on the subset of ciphertexts to which the ciphertext belongs) which key was used to generate it, obtain that key from the key database, and use that key to decrypt the ciphertext and produce a plaintext.

Similarly, length reducing decryptor 124 may decrypt ciphertexts encrypted using length-extending encryption method such as the one performed by length-extending encryptor 114 of encrypting device 110. For example, decryptor 124 may. determine the key reference based on the set of additional characters positioned at predefined positions, use the key reference to obtain the key from the key database, and decrypt the ciphertext using the obtained key. In addition, if encryptor 114 is configured to obfuscate the set of additional characters, decryptor 124 may first deobfuscate the set of additional characters by using a function opposite to the one used for obfuscating them.

Decryption method selector 125 may determine, based on the ciphertext, which of the two encryption methods discussed above was used to generate the ciphertext. In some examples, selector 125 may not be able to make this determination by comparing the length of the ciphertext to the predefined threshold length. For example, if the predefined threshold length is ten, a ciphertext eleven characters long can correspond to an eleven-character-long plaintext encrypted using length-preserving encryption, or to a nine-character-long plaintext encrypted using length-extending encryption (where two additional characters representing the key reference were added).

Accordingly, in some examples, selector 125 determines which encryption method was used to generate the ciphertext based on the character at a predefined position within the ciphertext. For example, if encryption method selector 115 uses the last character to indicate the encryption method, decryption method selector 125 may also use the last character to determine the encryption method. Selector 125 may determine whether the character is from a first subset of characters or from a second subset of characters, where the two subsets do not intersect, as discussed above in connection with encryptors 112 and 124. Based on a determination that the character is from the first subset of characters, selector 125 may determine that the ciphertext was generated using a length-preserving encryption method, and select length-preserving decryptor 122 to decrypt the ciphertext. Similarly, based on a determination that the character is from the second subset of characters, selector 125 may determine that the ciphertext was generated using a length-extending encryption method, and select length-reducing decryptor 124 to decrypt the ciphertext. Selecting a particular decryptor (122 or 124) to decrypt the ciphertext may include enabling the particular decryptor and disabling the other decryptor, or enabling both decryptors (unless they are enabled by default) and selecting the output of the particular decryptor as the output correctly representing the plaintext.

After obtaining the extended ciphertext, decrypting device 120 may pass the extended ciphertext to key reference extractor 124. Key reference extractor 124 may obtain, based on the extended ciphertext, the key reference that was embedded into the extended ciphertext (e.g., by key reference embedder 114 of encrypting device 110), and pass the key reference to format preserving decryptor 122. Key reference extractor 124 may obtain the key reference by obtaining from the extended ciphertext the set of characters that are positioned at the set of predefined positions, i.e., the same positions that were used by key reference embedder 114 discussed above. In some examples, the key reference may be determined directly based on the set of characters. In other examples, the set of characters may have been obfuscated based on the length or the contents of the ciphertext, as discussed above. In those examples, key reference extractor 124 may, after obtaining the set of characters, de-obfuscate the set of characters based on the ciphertext, e.g., by using a reverse function to the function that was used to obfuscate the set of characters.

After obtain the key reference, key reference extractor 124 may remove the key reference from the extended ciphertext, thereby producing the original ciphertext, and provide the original ciphertext to format preserving decryptor 122. For trial preserving decryptor 122 may then use the key reference to obtain the key with which the ciphertext was encrypted. For example, format preserving decryptor 122 may provide the key reference to key database 130, and in response receive from key database 130 the key corresponding to the key reference. Having obtained the key, format preserving decryptor 122 may decrypt the ciphertext using the obtained key, and thus obtain the plaintext. Format preserving decryptor 122 may then send the plaintext to another device, store it in a memory, display it on a display, and so forth.

Figure 3A:
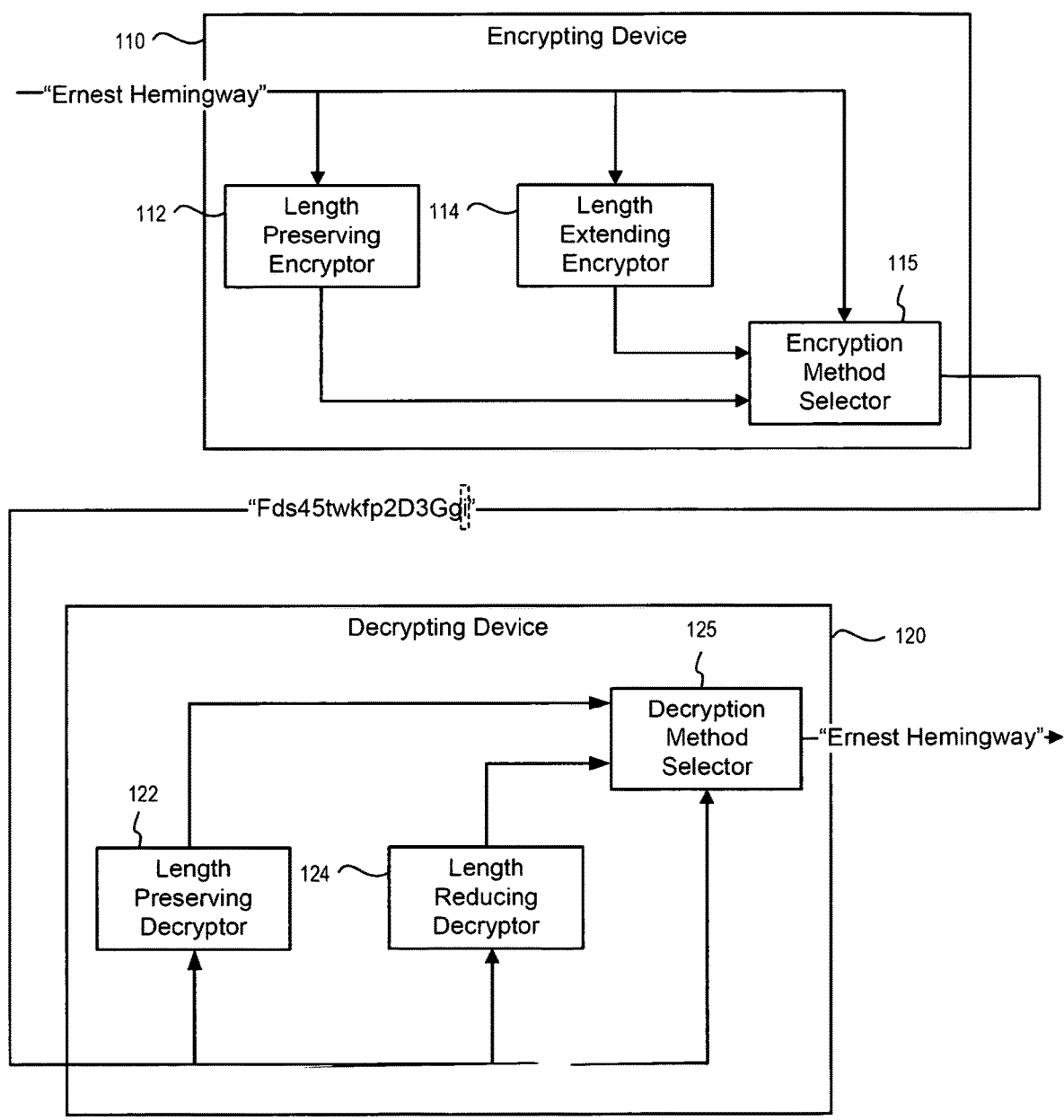
FIG. 3A shows an example system that includes an example encrypting device and an example decrypting device.
Figure 3B:
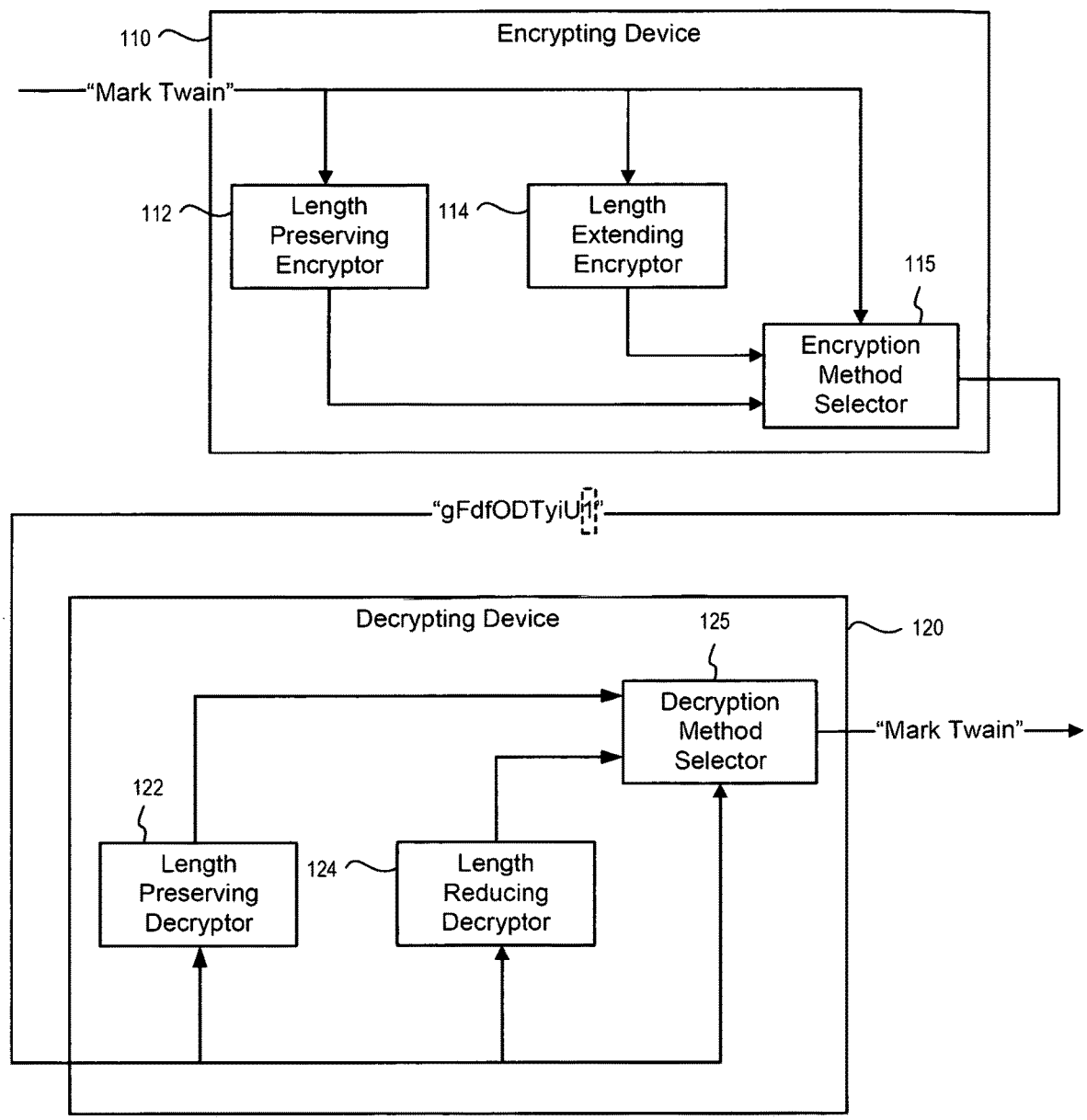
FIG. 3B also shows an example system that includes an example encrypting device and an example decrypting device.

FIGS. 3A and 3B illustrate an example cryptographic system 300 including an example encrypting device 110 and an example decrypting device 120. In these examples, the threshold length is predefined as ten; the last character of the ciphertext is predefined to indicate a length-preserving encryption method if it includes a digit, and a length-extending encryption method otherwise; and the last character is also predefined to be the additional value indicating the key reference, if the length-extending encryption method is used. The examples of FIGS. 3A and 3B illustrate how plaintext "Ernest Hemingway" and "Mark Twain," respectively, are encrypted and then decrypted by system 300.

In the example of FIG. 3A, encryption method selector 115 obtains plaintext "Ernest Hemingway," determines that it is longer than the predefined threshold length of ten, and therefore selects length-preserving encryptor 112 to encrypt it. Accordingly, encrypting device 110 outputs the ciphertext produced by encryptor 112. The produced ciphertext "Fds45twkfp2D3Ggi" is the same length as the plaintext, and its last character "i" is not a digit, indicating that the length-preserving encryption method was used. Decrypting device 120 obtains the ciphertext and passes it to decryption method selector 125. Selector 125 determines, based on the last character "i" not being a digit that a length-preserving encryption was used, and therefore selects length-preserving decryptor 122 to decrypt the ciphertext. Decryptor 122 determines, based on the ciphertext (e.g., based on which subset of ciphertexts it belongs to) which key was used to generate it, obtains that key from the key database, and decrypts the ciphertext using that key to produce plaintext "Ernest Hemingway."

In the example of FIG. 3B, encryption method selector 115 obtains plaintext "Mark Twain," determines that it is not longer than the predefined threshold length of ten, and therefore selects length-extending encryptor 114 to encrypt it. Accordingly, encrypting device 110 outputs the ciphertext produced by encryptor 114. The produced ciphertext "gFdfODTyiU1" is one character longer than the plaintext, because it includes the additional character "1". The additional character is a digit, which indicates that the ciphertext was generated using a length-extending encryption method. The additional character also indicates that key number 1 was used to generate the ciphertext. Decrypting device 120 obtains the ciphertext and passes it to decryption method selector 125. Selector 125 determines, based on the last character "1" being a digit that a length-extending encryption was used, and therefore selects length reducing decryptor 124 to decrypt the ciphertext. Decryptor 124 determines, based on the last character "1" that key number 1 was used to generate the ciphertext. Therefore, decryptor 124 obtains key number 1 from the key database, and decrypts the ciphertext using that key to produce plaintext "Mark Twain."

In the foregoing discussion, various engines (e.g., 112, 114, 115, 122, 124, and 125) were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 4:
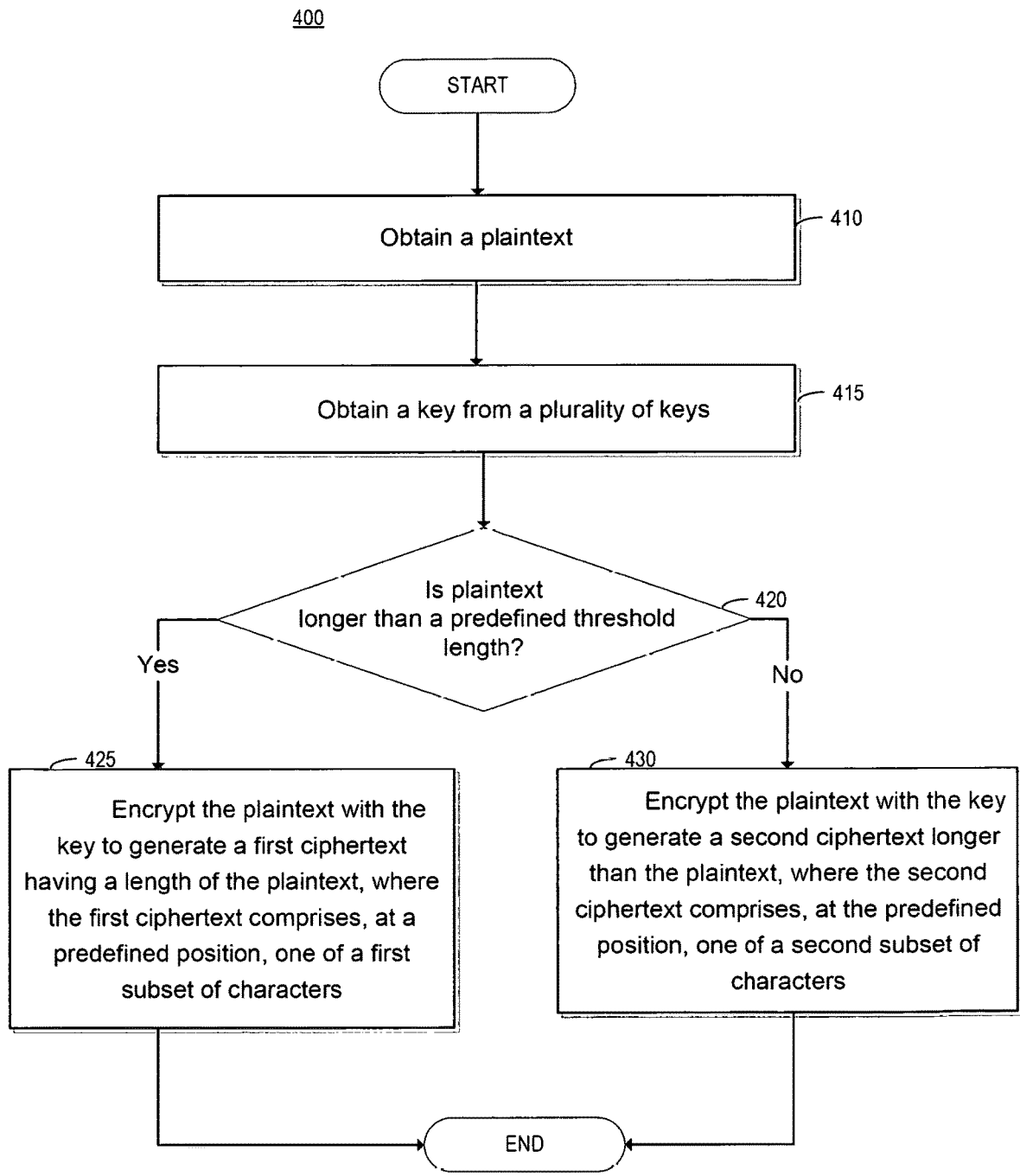
FIG. 4 shows an example method.

FIG. 4 is a flowchart of an example method 400. Method 400 may be described below as being executed or performed by a system or by an encrypting device such as encrypting device 110 of FIG. 1. Other suitable systems and/or encrypting devices may be used as well. Method 400 may be implemented in the form of executable instructions stored on at least one non-transitory machine-readable storage medium of the system and executed by at least one processor of the system. Method 400 may also be implemented in the form of electronic circuitry (e.g., hardware). In other examples of the present disclosure, any number of blocks of method 400 may be executed substantially concurrently or in a different order than shown in FIG. 4. In other examples of the present disclosure, method 400 may include more or less blocks than are shown in FIG. 4. In some examples, any blocks of method 400 may, at certain times, be ongoing and/or may repeat.

At block 410, method 400 may obtain a plaintext. At block 415, the method may obtain a key from a plurality of keys. At block 420, the method may determine whether the plaintext is longer than a predefined threshold length. If the plaintext is longer than the predefined threshold length, the method proceeds to block 425, where it may encrypt the plaintext with the key to generate a first ciphertext having a length of the plaintext, where the first ciphertext comprises, at a predefined position, one of a first subset of characters. If the plaintext is not longer than the predefined threshold length, the method proceeds to block 430, where it may encrypt the plaintext with the key to generate a second ciphertext longer than the plaintext, where the second ciphertext comprises, at the predefined position, one of a second subset of characters.

Figure 5:
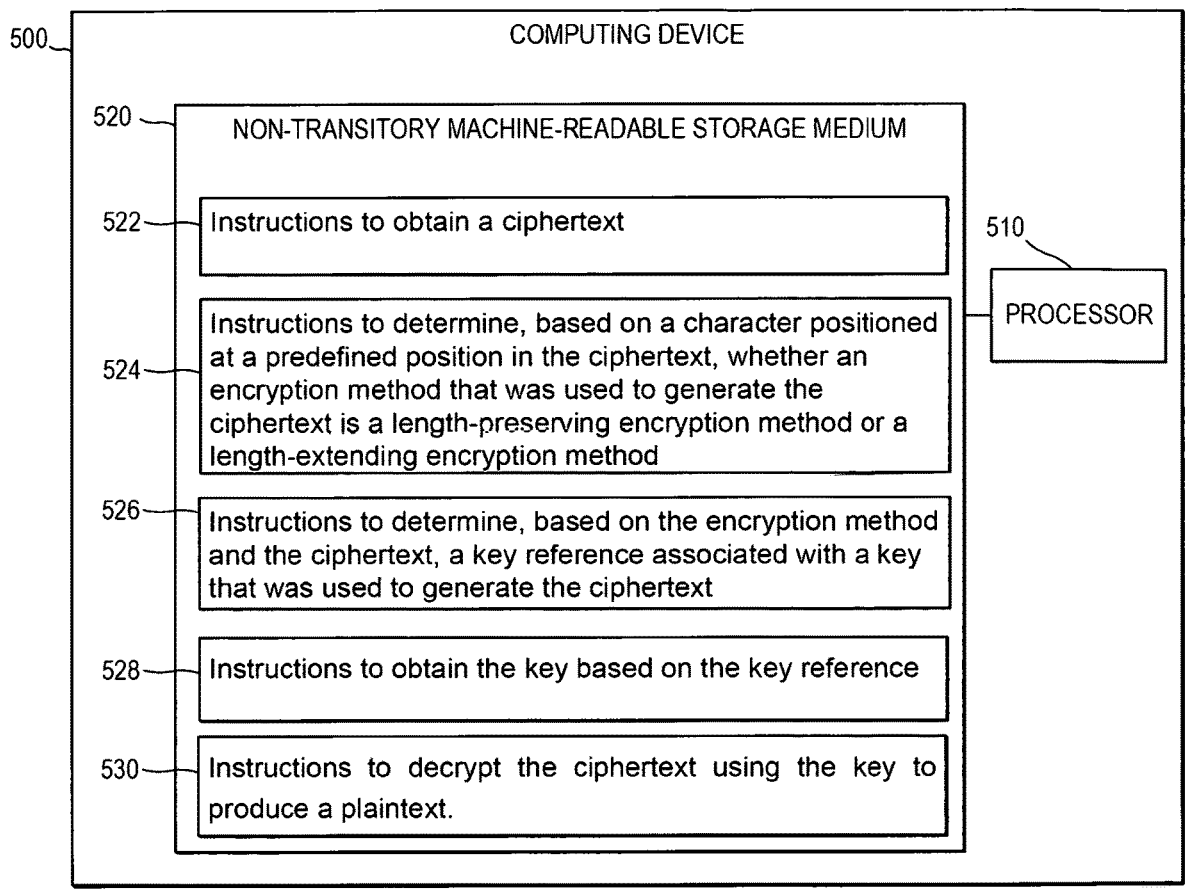
FIG. 5 is another block diagram of an example computing device.

FIG. 5 is a block diagram of an example computing device 500. Computing device 500 may be similar to or different from decrypting device 120 of FIG. 2. In the example of FIG. 5, computing device 500 includes a processor 510 and a non-transitory machine-readable storage medium 520. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 510 include any number of central processing units (CPUs), microprocessors, and/or other hardware devices suitable for retrieval and execution of instructions stored in non-transitory machine-readable storage medium 520. In the particular example shown in FIG. 5, processor 510 may fetch, decode, and execute instructions 522, 524, 526, 528, 530, and any other instructions (not shown for brevity). Instead of or in addition to retrieving and executing instructions, processor 510 may include any number of electronic circuits comprising a number of electronic components for performing the functionality of any number of instructions in machine-readable storage medium 520. With respect to the executable instruction representations (e.g., boxes) described and shown herein, it should be understood that part or all of the executable instructions and/or electronic circuits included within one box may, in other examples, be included in a different box shown in the figures or in a different box not shown.

Non-transitory machine-readable storage medium 520 may be any electronic, magnetic, optical, or other physical storage device that stores executable instructions. Thus, medium 520 may be, for example, Random Access Memory (RAM), an Electrically-Erasable Programmable Read-Only Memory (EEPROM), a storage drive, an optical disc, and the like. Medium 520 may be disposed within encrypting device 500, as shown in FIG. 5. In this situation, the executable instructions may be "installed" on computing device 500. Medium 520 may be a portable, external or remote storage medium, for example, that allows computing device 500 to download the instructions from the portable/external/remote storage medium. In this situation, the executable instructions may be part of an "installation package". As described herein, medium 520 may be encoded with executable instructions.

Referring to FIG. 5, instructions 522, when executed by a processor (e.g., 510), may cause a computing device (e.g., 500) to obtain a ciphertext. Instructions 524, when executed by the processor, may cause the computing device to determine, based on a character positioned at a predefined position in the ciphertext, whether an encryption method that was used to generate the ciphertext is a length-preserving encryption method or a length-extending encryption method. Instructions 526, when executed by the processor, may cause the computing device to determine, based on the encryption method and the ciphertext, a key reference associated with a key that was used to generate the ciphertext. Instructions 528, when executed by the processor, may cause the computing device to obtain the key based on the key reference. Instructions 530, when executed by the processor, may cause the computing device to decrypt the ciphertext using the key to produce a plaintext.

The invention claimed is:

1. An encrypting device comprising:
   an encryption method selector to:
      obtain a key from a plurality of keys,
      obtain a plaintext having a first length, and
      determine whether the plaintext is longer than a predefined threshold length;
   a length-preserving encryptor to:
      responsive to a determination, by the encryption method selector, that the plaintext is longer than the predefined threshold length, encrypt the plaintext using the key to produce a first ciphertext having the first length and including a character from a first subset of characters in a predefined position, wherein the character from the first subset of characters indicates a first encryption method was used to produce the first ciphertext; and
   a length-extending encryptor to:
      responsive to a determination, by the encryption method selector, that the plaintext is not longer than the predefined threshold length, encrypt the plaintext using the key to produce a second ciphertext having a second length, wherein the second length is longer than the first length, and including a character from a second subset of characters in the predefined position, wherein the character from the second subset of characters indicates a second encryption method was used to produce the second ciphertext, and wherein the first subset of characters does not intersect with the second subset of characters.

2. The encrypting device of claim 1, wherein:
   the length-preserving encryptor is to use the first encryption method to encrypt the plaintext, the first encryption method being ascertainable based on the character from the first subset of characters in the predefined position in the first ciphertext; and
   the length-extending encryptor is to use the second encryption method to encrypt the plaintext, the second encryption method being ascertainable based on the character from the second subset of characters in the predefined position in the second ciphertext.

3. The encrypting device of claim 1, wherein:
   the length-preserving encryptor is to produce the first ciphertext by pseudo-randomly mapping the plaintext into one of a first plurality of ciphertexts;

the length-extending encryptor is to produce the second ciphertext by pseudo-randomly mapping the plaintext into one of a second plurality of ciphertexts, wherein the first plurality of ciphertexts comprises more ciphertexts than the second plurality of ciphertexts.

4. A method comprising:
obtaining a plaintext;
obtaining a key from a plurality of keys;
determining, by an encryption selector, whether the plaintext is longer than a predefined threshold length;
based on a determination by the encryption selector that the plaintext is longer than the predefined threshold length, encrypting, by a first encryptor, the plaintext with the key to generate a first ciphertext having a length of the plaintext, wherein the first ciphertext comprises, at a predefined position, a character from a first subset of characters wherein the character from the first subset of characters indicates a first encryption method was used to produce the first ciphertext; and
based on a determination by the encryption selector that the plaintext is not longer than the predefined threshold length, encrypting, by a second encryptor, the plaintext with the key to generate a second ciphertext longer than the plaintext, wherein the second ciphertext comprises, at the predefined position, a character from a second subset of characters, wherein the character from the second subset of characters indicates a second encryption method was used to produce the second ciphertext, and wherein the second subset of characters does not intersect with the first subset of characters.

5. The method of claim 4, wherein a reference associated with the key is ascertainable based on one of the first ciphertext and the second ciphertext.

6. The method of claim 4, wherein a reference associated with the key is ascertainable based on a set of characters positioned at a set of predefined positions within one of the first ciphertext and the second ciphertext.

7. The method of claim 4, wherein the first ciphertext is generated by encrypting the plaintext using a length-preserving encryption method.

8. The method of claim 7, wherein the second ciphertext is generated by encrypting the plaintext using a length-extending encryption method.

9. The method of claim 8, wherein:
the length-preserving encryption method produces the first ciphertext by pseudo-randomly mapping the plaintext into one of a first plurality of ciphertexts; and
the length-extending encryption method produces the second ciphertext by pseudo-randomly mapping the plaintext into one of a second plurality of ciphertexts, wherein the first plurality of ciphertexts comprises more ciphertexts than the second plurality of ciphertexts.

10. A non-transitory machine-readable storage medium encoded with instructions executable by a processor of a computing device to cause the computing device to:
obtain a ciphertext;
based on a character positioned at a predefined position in the ciphertext, determine whether an encryption method that was used to generate the ciphertext is a length-preserving encryption method or a length-extending encryption method, wherein a character from a first subset of characters indicates that the length-preserving encryption method was used, wherein a character from a second subset of characters indicates that the length-extending encryption method was used, and wherein the first subset of characters does not intersect with the second subset of characters;
based on the encryption method and the ciphertext, determine a key reference associated with a key that was used to generate the ciphertext;
obtain the key based on the key reference; and
based on the encryption method, decrypt the ciphertext using the key to produce a plaintext.

11. The non-transitory machine-readable storage medium of claim 10, wherein determining the key reference comprises:
based on a determination that the encryption method is the length-extending encryption method, determining the key reference based at least on the character positioned at the predefined position in the ciphertext.

12. The non-transitory machine-readable storage medium of claim 10, wherein determining the key reference comprises:
based on a determination that the encryption method is the length-preserving encryption method, determining the key reference based on which subset of ciphertexts, among a plurality of subsets of ciphertexts, the ciphertext belongs to.

13. The non-transitory machine-readable storage medium of claim 10, wherein the instructions further cause the computing device to:
determine a length of the plaintext based on the character positioned at the predefined position in the ciphertext.

14. The non-transitory machine-readable storage medium of claim 12, wherein the length-preserving encryption method produces the ciphertext by pseudo-randomly mapping the plaintext into one of a plurality of ciphertexts.

15. The non-transitory machine-readable storage medium of claim 11, wherein the length-extending encryption method produces the ciphertext by pseudo-randomly mapping the plaintext into one of a plurality of ciphertexts.

\* \* \* \* \*